(12) United States Patent
Cavazza

(10) Patent No.: US 6,932,999 B2
(45) Date of Patent: Aug. 23, 2005

(54) FOOD SUPPLEMENTED WITH A CARNITINE, SUITABLE FOR STIMULATING THE BIOSYNTHESIS OF POLYUNSATURATED FATTY ACIDS FROM THE SATURATED FATTY ACIDS CONTAINED IN THE FOOD

(75) Inventor: Claudio Cavazza, Rome (IT)

(73) Assignee: Sigma-Tau Industrie Farmaceutiche Riunite S.p.A., Rome (IT)

( * ) Notice: Subject to any disclaimer, the term of this patent is extended or adjusted under 35 U.S.C. 154(b) by 200 days.

(21) Appl. No.: 10/148,588

(22) PCT Filed: Nov. 30, 2000

(86) PCT No.: PCT/IT00/00497

§ 371 (c)(1),
(2), (4) Date: Jun. 3, 2002

(87) PCT Pub. No.: WO01/39743

PCT Pub. Date: Jun. 7, 2001

(65) Prior Publication Data

US 2002/0192346 A1 Dec. 19, 2002

(30) Foreign Application Priority Data

Dec. 1, 1999 (IT) .................................... RM99A0732

(51) Int. Cl.⁷ .................... A23C 15/00; A23C 19/00; A23C 23/00
(52) U.S. Cl. .................... 426/580; 426/581; 426/582; 426/583; 426/663; 426/586
(58) Field of Search .................... 426/72, 69, 541, 426/580, 581–583, 586–588, 648, 656, 663; 424/439, 535; 514/579, 642

(56) References Cited

U.S. PATENT DOCUMENTS

| 4,753,926 A | | 6/1988 | Lucas et al. .................... 514/2 |
| 5,192,804 A | * | 3/1993 | Blum et al. .................. 514/554 |
| 5,601,860 A | | 2/1997 | Lien et al. ..................... 426/72 |
| 6,039,985 A | * | 3/2000 | Kamarei ....................... 426/72 |
| 6,080,788 A | * | 6/2000 | Sole et al. ................... 514/561 |
| 6,472,011 B1 | * | 10/2002 | Yakabe et al. .............. 426/583 |

FOREIGN PATENT DOCUMENTS

| WO | 98/43617 A | 10/1998 |
| WO | 00/65934 A | 11/2000 |

OTHER PUBLICATIONS

Bela Melegh; "Changes of Plasma Free Amino Acids and Renal Clearances of Carnitines in Premature Infants During 1–Carnitine–Supplemented Human Milk Feeding"; Journal of Pediatric Gastroenterology and Nutrition, vol. 7, No. 3, 1988, pp. 424–429, XP000993433.

Campoy, C. et al; "Evaluation of Carnitine Nutitional Status in Full–Term Newborn Infants"; Early uman Development, vol. 53, No. SUPPL., 12, 1998; XP001002319.

* cited by examiner

*Primary Examiner*—Keith Hendricks
(74) *Attorney, Agent, or Firm*—Nixon & Vanderhye P.C.

(57) ABSTRACT

A food selected from the group comprising milk and dairy products derived from milk, comprising a carnitine in an effective amount to stimulate, through the natural fatty acid metabolic processes that take place in a consumer of said food, the synthesis of polyunsaturated fatty acids from the saturated fatty acids originally contained in the food, the synthesis of polyunsaturated fatty acid from the saturated fatty acids originally contained in the food.

9 Claims, No Drawings

FOOD SUPPLEMENTED WITH A CARNITINE, SUITABLE FOR STIMULATING THE BIOSYNTHESIS OF POLYUNSATURATED FATTY ACIDS FROM THE SATURATED FATTY ACIDS CONTAINED IN THE FOOD

This application is the U.S. national phase of international application PCT/IT00/00497 filed 30 Nov. 2000, which designated the U.S.

The present invention relates to milk and food stuffs derived from the processing of milk (i.e. dairy products) supplemented with an agent suitable for stimulating, through the natural metabolic processes that take place in the body, the synthesis of polyunsaturated fatty acids starting from the saturated fatty acids originally contained in the above-mentioned foods.

In the context of the present invention what is meant by "milk", which by definition is the integral product of a complete, uninterrupted milking of a healthy, well nourished milk-bearing female, obtained by manual or mechanical milking, is not only cow's milk and the skimmed milk, delactosed milk, powder milk and condensed milk derived from it, but also cow-buffalo's milk, goat's milk and sheep's milk.

Therefore, in the context of the present invention, what is meant by "food stuffs derived from the processing of milk" are not only butter, cream, cottage cheese, yoghurt, kefir, milk cheese (i.e. cow's milk mozzarella) and fresh and ripened cheeses (such as, for example, grana padano and Parmesan cheese) derived from the processing of cow's milk, but also cheese products derived from the processing of cow-buffalo's, goat's and sheep's milk, such as, for example, buffalo milk cheese or mozzarella, provola, ewe cheese or Pecorino (e.g. Roman Pecorino, Sicilian Pecorino), Sardinian milk cheese, Urbino sheep's milk cheese, blue cheese, etc.

Fresh milk, i.e. milk from animals that have just been milked, consists essentially, with more or less minor variations of the various components from one animal species to another, of 87–88% water, 4.5–4.8% sugars, 3.5–7.5% lipids, 3.2–6% proteins and traces of mineral salts and vitamins.

Milk lipids consist substantially in fatty acid triglycerides which constitute 96–99% of total lipids (the remaining fraction being mainly composed of diglycerides, phospholipids, sterols and cerebrosides).

Fatty acids are classified as saturated and unsaturated on the basis of the presence or otherwise of double bonds in their chain. Saturated fatty acids (whose synthesis is catalysed by different enzyme systems such as acetyl-CoA-carboxylase, fatty acid synthetase and citrate synthetase) do not contain double bonds, while the unsaturated fatty acids present one or more double bonds between the carboxyl and the terminal methyl at the opposite end of the chain. Whereas a role in energy metabolism is mainly attributed to the saturated fatty acids, the unsaturated fatty acids also have important biological functions as structural components of the membranes, as precursors of the eicosanoids, such as prostaglandins and leukotrienes, and as cholesterol transport agents.

Starting from acetyl-coenzyme A, the body, by means of a synthetase enzyme system, is capable of synthesizing fatty acids with up to 16 carbon atoms, elongating their chain and desaturating them at the microsomal level.

This desaturation does not occur in man between the methyl and seventh carbon atom proceeding. towards the carboxyl, and the essentiality of polyunsaturated fatty acids omega-3 (n3) and omega 6 (n6) is due precisely to this inability.

Two important polyunsaturated essential fatty acids such as linoleic acid (c18:2n6) and linolenic acid (c18:3n3) therefore have to be ingested with the diet.

The table here below presents the fatty acid percentage composition of the lipids of cow's milk.

|  |  | Cow's milk lipids | |
| --- | --- | --- | --- |
| Fatty acids |  | I.M.* | R** |
| Saturated fatty acids | | | |
| Butyric | 4:0 | 3.3 | 2.3–5.2 |
| Caproic | 6:0 | 2.1 | 1.4–4.0 |
| Caprylic | 8:0 | 1.4 | 0.9–2.2 |
| Capric | 10:0 | 3.0 | 2.2–4.2 |
| Lauric | 12:0 | 3.6 | 2.4–4.6 |
| Myristic | 14:0 | 11.5 | 8.4–13.6 |
| Palmitic | 16:0 | 30.8 | 24.0–36.9 |
| Stearic | 18:0 | 9.5 | 6.6–13.2 |
| Arachic | 20:0 | | |
| Other | | 2.4 | |
| Monounsaturated fatty acids | | | |
| Myristoleic | 14:1 | 1.9 | 1.4–2.2 |
| Palmitoleic | 16:1 | 2.8 | 2.2–3.3 |
| Oleic | 18:1 | 22.5 | 25.9–18.8 |
| Other | | 1.3 | |
| Polyunsaturated fatty acids | | | |
| Linoleic | 18:2 | 2.3 | 1.4–3.6 |
| Linolenic | 18:3 | 1.5 | 0.6–2.8 |

*Indicative mean
**Range

Palmitic acid is the most important fatty acid produced by most of the biosynthesis systems, and other saturated or unsaturated long-chain fatty acids can be derived from it.

The fatty acid desaturation site for the formation of unsaturated fatty acids is located in the microsomes and the introduction of a double bond in a preformed fatty acid requires the intervention of molecular oxygen as an electron acceptor. This system, which is called mixed-function oxygenase, in the presence of $O_2$ and NADHP, catalyzes the desaturation of preformed fatty acids in the form of acyl-CoA.

Undergoing various processes of elongation and desaturation, palmitic acid plays a central role in the formation of unsaturated fatty acids.

The fats contained in milk and its derivatives also undergo the metabolism common to all fatty acids, in which the presence of L-carnitine is of fundamental importance for their utilisation.

The role of L-carnitine and alkanoyl L-carnitines, particularly of acetyl L-carnitine is, in fact, essential in the processes of fatty acid beta-oxidation which takes place above all in the mitochondria with prior transformation to the thioesters of Coenzyme A catalyzed by acyl-CoA-thiokinase. The transport of acyl-CoAs from the activation sites to the oxidation sites is carried out by L-carnitine by means of an enzyme, acyl-CoA carnitine acyltransferase, located on the inner membrane of the mitochondria which is permeable to the carnitine esters but not to the acyl-CoAs, CoASH or free L-carnitine.

As can be seen in the table above, the quantity of essential fatty acids present in cow's milk is very low: 2.3% for linoleic acid and 1.5% for linolenic acid, as against 23% for oleic acid, 30% for palmitic acid, 11% for myristic acid and 9.5 for stearic acid.

These low concentrations of the essential fatty acids, linoleic and linolenic acid, are totally inadequate for balanced nutrition based on the intake of milk, as is the case above all in infant children, but also in the elderly and in convalescent subjects. Nor, obviously, can the intake of essential fatty acids be increased by introducing into the diet products (dairy products) obtained from the processing of milk.

In the past, milk was produced supplemented with factors which are not present or are present in inadequate amounts in normal cow's milk (e.g. vitamins, nitrogenous substances, etc.) bearing in mind not only the particular dietetic requirements of infants, but also those of elderly subjects, sick people and convalescent subjects. More recently, in the wake of the interest aroused by extensive clinical studies which have proved the therapeutic efficacy, in cardiovascular disease, of polyunsaturated fatty acids of the omega-3 and omega-6 series, which are particularly present in the fish-rich diets of certain Nordic peoples, types of milk supplemented with omega-3 fatty acids have been marketed for general consumption.

The addition of these fatty acids to the milk, however, entails a number of technological problems due to the need to obtain a product which maintains the characteristics of stability and conservability and, above all, the agreeable organoleptic properties of natural milk. It is well known, in fact, that the omega-3 series fatty acids such as eicosapentaenoic acid (EPA) and docosahexaenoic acid (DHA) are extracted from fish oil and present a substantial tendency to oxidation in air with the result that the milk turns rancid, converting to oxidized sideproducts with an irritating and distinctly disagreeable odour and taste.

It has now surprisingly been found that the addition of a carnitine (a term which will be defined here below) to the above-mentioned milk and dairy products powerfully stimulates, through the natural metabolism of fatty acids that occurs in a consumer of such foods, the synthesis of polyunsaturated fatty acids starting from the saturated fatty acids originally contained in such foods.

The object of the present invention is, therefore, a food selected from the group comprising milk and dairy products, characterized in that it comprises a carnitine selected from the group comprising of L-carnitine, acetyl L-carnitine, propionyl L-carnitine or their pharmacologically acceptable salts, or mixtures thereof, in an effective amount for stimulating the synthesis of polyunsaturated fatty acids from the saturated fatty acids originally contained in said food, in the course of the natural metabolic processes that take place in a consumer of said food.

The milk can be selected from cow's milk (or skimmed milk, delactosed milk, powder milk or condensed milk obtained from cow's milk), cow-buffalo milk, goat's milk or sheep's milk. The dairy products obtained from the above-mentioned milks include products such as butter, cream, cottage cheese, yoghurt, kefir, milk cheese or cow's milk mozzarella, fresh and ripened cheeses (e.g. grana padano or Parmesan cheese), cow-buffalo milk cheese or mozzarella, provola, ewe cheese or Pecorino, Roman Pecorino, Sicilian Pecorino, Sardinian milk cheese, Urbino sheep's milk cheese and the like.

The amount of L-carnitine, acetyl L-carnitine and propionyl L-carnitine (alone or in various mixtures) added to the milk or dairy products obtained from milk may vary within broad limits owing to the substantial non-toxicity of these compounds. In the case of "milk", the amount may range from 400 mg to 8,000 mg/L of food product, and preferably from 1,000 mg to 4,000 mg/L.

In the case of butter, yoghurt, kefir and both fresh and ripened cheeses, such amount may range from 500 mg 70 9,000 mg/kg of food products, and preferably from 1,500 to 4,500 mg/kg of food product.

Both the "milk" and the products derived from milk processing can be supplemented with other substances selected from the group comprising vitamins (e.g. vitamin E, vitamin C, vitamin $B_6$), coenzymes, mineral substances, amino acids and antioxidants, polyphenols (of grapes), catechins (of tea), anthocyanins, selenium (methionine), calcium salts and the like.

A number of pharmacological tests illustrating the invention described herein are reported here below.

Plasma Lipid Tests in Animals on a Diet Consisting of Milk Alone or Milk Plus Carnitines For these tests a batch of New Zealand male rabbits with a mean body weight of 3.7 kg was used, which, after a period of acclimatisation on a standard diet for eight days, were divided into different groups. One group received standard diet alone, while a second group received unskimmed milk mixed with pellets of the normal diet whose final composition was as follows: 4% fats, 24% proteins, 58% carbohydrates, 0.7% fibre, 10% water, 3% minerals and 1% vitamins.

Another group of animals was administered a milk diet supplemented with L-carnitine, acetyl L-carnitine or propionyl L-carnitine in amounts such that, on the basis of the food intake, the daily administration was 200 mg/kg body weight of L-carnitine, acetyl L-carnitine or propionyl L-carnitine.

After four weeks of treatment, blood samples were taken from the marginal vein of the ear and the plasma lipids obtained were subjected to measurement of the percentages of both saturated fatty acids and polyunsaturated fatty acids. The percentage amounts of unsaturated omega-3 fatty acids present in liver samples taken from the same animals were also measured. While total lipids were measured according to the method described by Schanfeld (Schanfeld G., *J. Clin. Invest.*, 226:497, 1957) and Folch (Folch J., *J. Biol. Chem.*, 226:497, 1957), the triglycerides and phospholipids were measured according to the method described by Terstra (Terstra A. H. M., *Anal. Biochem.*, 11:149, 1981) and the n-3 and n-6 fatty acids according to the method described by Nestel (Nestel P. J., *Ann. Rev. Nutr.*, 10:149, 1990) and Cevec (Cevec G., *Biochemistry*, 30:7:7186, 1991).

The data reported in Table 1 demonstrate that the milk diet does not improve the ratio of polyunsaturated to saturated fatty acids, which appears unchanged or slightly worsened as compared to controls. In those animals in which carnitines were administered together with the same milk diet, the ratio was distinctly improved due to an increase in polyunsaturated fatty acids, and this was particularly evident following administration of acetyl L-carnitine and propionyl L-carnitine.

This new particular and unexpected activity of the carnitines added to the milk was also evident in the examinations performed on the liver specimens taken from the animals on the different diets. The data in Table 2, in fact, show a surprising increase in n-3 fatty acids, resulting in the improvement of the ratio of n-3 to n-6 fatty acids. In these tests, too, propionyl L-carnitine proved to be the most active compound.

TABLE 1

P/S (polyunsaturated to saturated fatty acids) ratio in basal conditions and after 30 days on various diets.

|  | day 0 | day 30 |
| --- | --- | --- |
| Standard diet | 0.55 | 0.52 |
| Milk diet | 0.59 | 0.47 |
| Milk diet + L-carnitine | 0.52 | 0.72 |
| Milk diet + acetyl L-carnitine | 0.56 | 0.85 |
| Milk diet + propionyl L-carnitine | 0.55 | 0.88 |

TABLE 2 n-3 and n-6 fatty acids present in hepatic phospholipids.
Percentage values of total lipids at baseline and after 30 days on diet.

Phospholipid baseline values n-6 = 20.5
n-3 = 76.9
n-6:n-3 ratio = 1.215

Phospholipid values after 30 days n-6 = 13.5
n-3 = 35.6
n-6:n-3 ratio = 0.38

The milks supplemented with carnitine according to the present invention are not to be confused, either as regards composition or as regards aims, with the "infant formulas", possibly containing carnitine, already on the market or described in the literature. The infant formulas are artificial milks in which the manufacturer's primary aim is to reproduce the composition of mother's milk (see, for example, U.S. Pat. Nos. 3,542,560, 4,282,265, 4,614,663, 4,721,626 and 4,879,131). More recently, infant formulas have been proposed, supplemented with substances suitable to prevent or cure even severe diseases typical of neonates or suckling infants. For example, U.S. Pat. No. 5,686,491 discloses an infant formula containing 2.5–3.5 g of proteins/kg body weight, carbohydrates, lipids and at least 50–150 mg of L-carnitine/kg body weight, in which the carbohydrate:lipid ratio is equal to or greater than 60:40. This infant formula is particularly suitable for the nutrition of suckling infants suffering from fatty acid catabolism disorders such as medium-chain acyl-CoA dehydrogenase deficiency (MCAD), long-chain acyl-CoA dehydrogenase deficiency (LCAD), short-chain acyl-CoA dehydrogenase deficiency (SCAD) and multiple-chain acyl-CoA dehydrogenase deficiency (MADD) and for the prevention of cases of sudden infant death syndrome (SIDS) and growth failure syndrome (FITS).

The marked differences in composition, destination and aims between the infant formulas and the milks according to the present invention are therefore evident.

Also evident are the advantages which can be achieved with the foods according to the invention, which, after being ingested and in conjunction with the natural metabolic processes of the consumer, make it possible to increase the endogenous amount of polyunsaturated fatty acids with an attendant reduction in the saturated fatty acids in which these foods, especially butter and ripened cheeses, are rich. This is particularly significant in view of the growing attention which is being justifiably accorded to diet, also by perfectly healthy individuals, and to the care taken to avoid foods with a high content of saturated fatty acids for the purposes of preventing various diseases including most notably metabolic disorders and cardiovascular diseases.

The present invention makes available dairy products which, whilst fully conserving their nutritional and organoleptic properties, are equivalent to products with a higher content of unsaturated fatty acids and a lower content of saturated fatty acids, thus assuring safer and wider consumption.

Furthermore, from the technological standpoint, the addition of carnitine to milk and its derivatives presents none of the above-mentioned operational difficulties caused by the addition to milk of substances which easily turn the milk rancid, such as fatty acids of the omega-3 series, with the consequent hazard of altering the organoleptic properties of the resulting food product which, despite such addition, maintains its original disadvantageously high content of saturated fatty acids.

Illustrative, non-limiting examples of compositions according to the invention are. reported hereinbelow.

| 1) | Whole cow's milk | ml | 100 |
| --- | --- | --- | --- |
|  | L-carnitine | mg | 100 |
| 2) | Skimmed or partially skimmed cow's milk | ml | 100 |
|  | L-carnitine | mg | 50 |
| 3) | Whole cow's milk | ml | 100 |
|  | Acetyl L-carnitine | mg | 100 |
| 4) | Skimmed or partially skimmed cow's milk | ml | 100 |
|  | Acetyl L-carnitine | mg | 50 |
| 5) | Whole cow's milk | ml | 100 |
|  | Propionyl L-carnitine | mg | 100 |
| 6) | Skimmed or partially skimmed cow's milk | ml | 100 |
|  | Propionyl L-carnitine | mg | 50 |
| 7) | Whole cow's milk | ml | 100 |
|  | L-carnitine | mg | 50 |
|  | Acetyl L-carnitine | mg | 50 |
|  | Propionyl L-carnitine | mg | 50 |
| 8) | Skimmed or partially skimmed cow's milk | ml | 100 |
|  | L-carnitine | mg | 25 |
|  | Acetyl L-carnitine | mg | 25 |
|  | Propionyl L-carnitine | mg | 25 |
| 9) | Yoghurt | g | 100 |
|  | L-carnitine | mg | 50 |
|  | Acetyl L-carnitine | mg | 50 |
|  | Propionyl L-carnitine | mg | 50 |
| 10) | Butter | g | 100 |
|  | L-carnitine | mg | 100 |
|  | Acetyl L-carnitine | mg | 100 |
|  | Propionyl L-carnitine | mg | 100 |
| 11) | Whole cow's milk | ml | 100 |
|  | L-carnitine | mg | 100 |
|  | Acetyl L-carnitine | mg | 100 |
|  | Propionyl L-carnitine | mg | 100 |
|  | Vit. E | mg | 2 |
|  | Vit. C | mg | 30 |
|  | Vit. $B_6$ | mg | 0.5 |
| 12) | Whole cow's milk | ml | 100 |
|  | L-carnitine | mg | 50 |
|  | Acetyl L-carnitine | mg | 50 |
|  | Propionyl L-carnitine | mg | 50 |
|  | Grape's polyphenols | mg | 100 |
|  | Catechins (derived from tea) | mg | 100 |
|  | Calcium | mg | 100 |
| 13) | Yoghurt | g | 100 |
|  | L-carnitine | mg | 50 |
|  | Acetyl L-carnitine | mg | 50 |
|  | Propionyl L-carnitine | mg | 50 |
|  | Polyphenols | mg | 100 |
|  | Catechins | mg | 100 |
|  | Anthocyanins | mg | 20 |
|  | Selenium methionine | µg | 50 |

What is claimed is:

1. A food consisting of a dairy product derived from milk comprising a carnitine selected from the group consisting of L-carnitine, acetyl L-carnitine, propionyl L-carnitine, a mixture thereof and a pharmacologically acceptable salt of the carnitine, in an effective amount of from 400 mg to 9,000 mg/L or mg/kg of food product to stimulate upon ingestion, through the natural fatty acid metabolism processes that take place in a consumer of said food, the synthesis of polyunsaturated fatty acids from the saturated fatty acids originally contained in the food.

2. The food of claim 1, wherein the food is a dairy product derived from the processing of cow's milk, cow-buffalo's milk, goat's milk or sheep's milk.

3. The food of claim 2, wherein the food is a dairy product and is derived from the processing of cow's milk and is selected from the group consisting of butter, cream, cottage cheese, yoghurt, kefir, mozzarella cheese, fresh cheese, ripe cheese, grana padano and parmesan cheese.

4. The food of claim 2, wherein the food is a dairy product derived from the processing of cow-buffalo's milk, goat's milk or sheep's milk and is selected from the group consisting of cow-buffalo's mozzarella cheese, provola, goat's milk cheese, ewe's milk, Roman pecorino, Sicilian pecorino, Sardinian cheese and caciotta d'Urbino.

5. The food of claim 2, comprising from 500 to 9,000 mg/kg of a carnitine selected from the group consisting of L-carnitine, acetyl L-carnitine, propionyl L-carnitine and a mixture thereof or a pharmacologically acceptable salt of the carnitine.

6. The food of claim 5, comprising from 1,500 to 4,500 mg/kg of a carnitine selected from the group consisting of L-carnitine, acetyl L-carnitine, propionyl L-carnitine or a mixture thereof or a pharmacologically acceptable salt of the carnitine.

7. The food of claim 1, further comprising vitamins, coenzymes, mineral substances, amino acids and antioxidants.

8. A method of stimulating in a consumer of a food consisting of a dairy product derived from milk, through the natural fatty acid metabolism processes of said consumer, the synthesis of polyunsaturated fatty acids from the saturated fatty acids originally contained in the food, which process comprises administering to the consumer a food consisting of dairy products derived from milk to which has been added a carnitine selected from the group consisting of L-carnitine, acetyl L-carnitine, propionyl L-carnitine, a mixture thereof and a pharmacologically acceptable salt of the carnitine, in an effective amount to stimulate said synthesis.

9. The method of claim 8, wherein the food is a dairy product and the quantity added to the dairy product is 500–9,000 mg/kg of the dairy product.

* * * * *